June 23, 1936.  J. D. BLACKALL  2,044,932
METHOD OF CUTTING PLASTIC MATERIAL AND TOOL THEREFOR
Filed June 8, 1934

Inventor,
James D. Blackall
By Eakin & Avery
Attys.

Patented June 23, 1936

2,044,932

UNITED STATES PATENT OFFICE 2,044,932

METHOD OF CUTTING PLASTIC MATERIAL AND TOOL THEREFOR

James D. Blackall, Watertown, Mass., assignor to Hood Rubber Company, Inc., Watertown, Mass., a corporation of Delaware Application June 8, 1934, Serial No. 729,725

9 Claims. (Cl. 164—29)

This invention relates to the cutting of plastic material, especially unvulcanized sheet rubber, for example, such as is used in the production of parts for rubber footwear.

Cutting dies as used for such purpose heretofore have been objectionable in many cases in that the resulting cut edges have been concave rather than straight-cut as desired.

The chief objects of this invention are to provide improved procedure for cutting rubber and other plastic material to produce cut edge surfaces different in form from those produced by the prior cutting procedures, to provide for producing straight-cut edges, and to provide an improved cutting tool for such purpose.

These and further objects will be apparent from the following description, reference being had to the accompanying drawing, in which.

Figure 3:
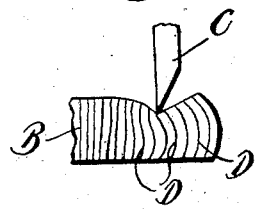
Figs. 3 and 4 are diagrammatic views illustrating the manner of cutting as practiced heretofore.
Figure 4:
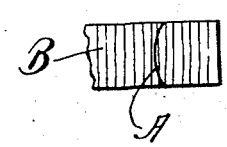

Referring first to Figs. 3 and 4, illustrating the prior method of cutting, an objectionable concave edge A on the sheet stock B has resulted from the fact that when the edge of a cutter C is pressed through the stock, the pressure set up within the sheet in the lateral direction is greater one way than the other and a lateral bulging results in the direction of the lesser resistance, for example toward the edge of the sheet if the cutting is done near such edge, or in the direction away from the cutting edge of a closed-periphery die, the material being freer to yield in that direction than the other, in which it is resisted by the confining influence of the die. The bulging referred to is illustrated in Fig. 3 by the bowing of imaginary lines D, D which in the unstressed sheet are straight and vertical.

Owing to such bulging, the edge of the severed sheet, upon recovery from the stressed condition, assumes the objectionable concave form A.

To the end of obtaining a straight-cut edge surface, according to the invention, provision is made for resisting the objectionable lateral bulging above referred to while the cutting edge passes through the material.

For this purpose a cutting die 10, having a closed-periphery cutting blade 11 is provided with an auxiliary cutting blade 12 disposed along the blade 11 for the extent over which it is desired to obtain the straight-cut edges, and marginally outward of the blade 11. The auxiliary blade is in such laterally close-spaced relation to the blade 11 as to resist bulging of the stock in that direction, transverse to the blade movement, so that a flat-edged cut is made by the blade 11.

Figure 5:
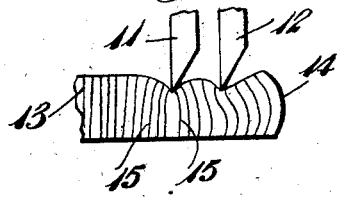
Figs. 5 and 6 are diagrammatic views illustrating the manner of cutting as practiced according to this invention in its preferred form.
Figure 6:
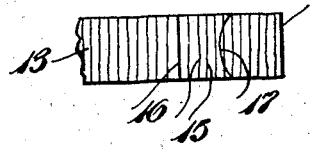

This action is illustrated in Figs. 5 and 6 wherein sheet rubber stock 13 is being cut near a margin 14 thereof, toward which, to the right in the drawing, is the direction in which the stock can bulge with less resistance than in the direction to the left when cut with an ordinary cutting die. In the use of the die here shown the tendency of the stock beneath the blade 11 to bulge toward the right hand margin is resisted by the downward pressure on the stock at the auxiliary blade 12, which is pressed downward simultaneously with the blade 11, so that imaginary lines 15, 15, which are vertical and straight in the unstressed stock, are distorted during the cutting approximately as shown in Fig. 5, and a straight-cut edge 16 results at the blade 11 when the cut stock is relieved of the stress. It does not matter that a concave cut edge 17 results at the blade 12 as this is in waste stock.

Figure 1:
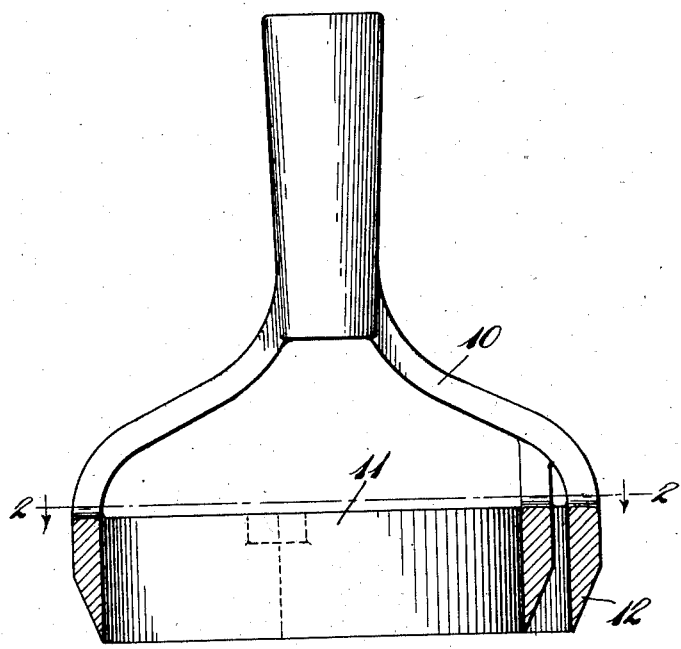
Fig. 1 is a vertical section of a cutting die constructed according to and embodying the invention in its preferred form.
Figure 2:
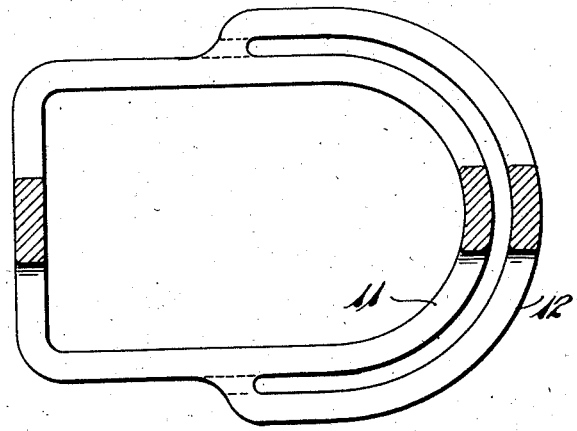
Fig. 2 is a section taken along the ine 2—2 of Fig. 1.
Figure 7:
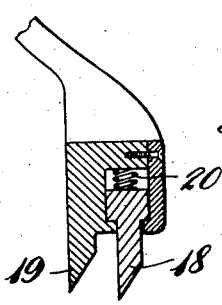
Fig. 7 is a fragmentary cross section showing a modified cutter construction embodying the invention.

In some cases it may be desirable to position the auxiliary blade 12 with its edge somewhat lower than the edge of the cutting blade, as in the modification shown in Fig. 7, so that the auxiliary blade will precede the main blade in entering the stock and provide even greater resistance to lateral bulging of the stock. For such procedure, provision is made, as by means of a soft cutter backing material into which the auxiliary blade may penetrate, to permit the main blade to pass entirely through the stock, or as shown in Fig. 7, the auxiliary blade 18, positioned with its edge below the main blade 19, may be spring backed at 20, the spring being of such stiffness as to permit the blade 18 to precede the other through the stock but to yield when pressed against the backing surface to permit the main blade to complete its cut.

I claim:

1. The method of cutting sheet plastic material which comprises so forcing a cutting die through the sheet as completely to sever a blank therefrom and at the same time so restraining the material at the zone of cutting from yielding transversely to the blade movement by simultaneously forcing an adjacent blade into the sheet as to produce a cut edge surface substantially free from curvature in a direction perpendicular to the face of the sheet.

2. A cutter for plastic sheet material comprising a frame, a cutting blade mounted thereon, and a second cutting blade mounted thereon, the cutting edge of the second blade being so closely positioned laterally of the edge of the first that when the blades are pressed into the material transverse bulging of the material at the zone of cutting of the first blade is resisted by the second blade.

3. A cutter as defined in claim 2 in which the first said blade has a closed-periphery cutting edge and the second blade extends over at least a part of the circumference thereof.

4. A cutter as defined in claim 2 in which the cutting edge of the said second blade is so positioned as to precede the edge of the first blade in the entry of the blades into the material.

5. A cutter as defined in claim 2 in which the cutting edge of the said second blade is so positoned as to precede the edge of the first blade in the entry of the blades into the material and the second blade is resiliently mounted so as to yield when pressed against a backing to permit the first blade to complete its cutting movement.

6. A cutting die comprising a blade corresponding in shape to the outline of a blank to be produced and having a curved edge portion, and an auxiliary blade extending along the curved portion exteriorly thereof and terminating at a point spaced laterally therefrom.

7. A cutting die comprising a cutting blade shaped to correspond to the outline of a sole to be produced, and a U-shaped auxiliary blade secured to the main blade and extending along the heel portion of the main blade and spaced therefrom.

8. A die for producing shoe part blanks comprising a blade having a portion thereof curved to correspond to a portion of a periphery of a blank to be produced, and a U-shaped auxiliary blade secured to the main blade and extending along a curved portion thereof and having a cutting edge spaced from and substantially parallel to the cutting edge of the main blade.

9. A cutting die comprising a cutting blade having an edge shaped to correspond to the outline of a blank to be produced, and an auxiliary blade secured to the main blade and having an edge extending parallel to the edge of the main blade and terminating at points spaced from the main blade.

JAMES D. BLACKALL.